United States Patent

Schwarz

[15] 3,680,874
[45] Aug. 1, 1972

[54] FLEXIBLE PNEUMATIC DUCT CONNECTORS ASSEMBLED WITH INTERNAL SEALS

[72] Inventor: Steven E. Schwarz, Long Beach, Calif.

[73] Assignee: Federal-Mogul Corporation, Detroit, Mich.

[22] Filed: Aug. 24, 1970

[21] Appl. No.: 66,501

[52] U.S. Cl. ................277/153, 277/205, 285/111, 285/231
[51] Int. Cl. ............................................F16j 15/46
[58] Field of Search ........285/111, 112, 231; 277/26, 277/153, 205

[56] References Cited

UNITED STATES PATENTS

| | | | |
|---|---|---|---|
| 2,049,801 | 8/1936 | Gage | 285/231 |
| 2,494,855 | 1/1950 | Anderson | 285/231 |
| 2,675,254 | 4/1954 | Davis et al. | 285/231 |
| 3,512,789 | 5/1970 | Tanner | 277/26 |

*Primary Examiner*—Robert I. Smith
*Attorney*—Fulwider, Patton, Rieber, Lee & Utecht

[57] ABSTRACT

A pair of duct ends are received within opposite ends of a larger diameter housing, each end of the housing being formed with an internal circumferential seal seat groove defined, in part, by an endless radially disposed flange. A continuous radial clearance gap is defined between the outside of each duct end and the radially inner edge of the corresponding flange to accommodate angulation of the duct end. An annular seal assembly is matingly mounted within each of the seal grooves of the housing in a radially compressed preload condition on the outside of the corresponding duct end, the seal assemblies serving to flexibly mount the housing on the two duct ends while preserving the radial clearance gap. Each seal assembly comprises an annular jacket of generally C-shaped radial section enclosing an endless garter spring that biases radially inner and outer walls of the jacket into static sealing contact with the duct end and the housing interior, in the preload condition. The jacket is made of a lubricant impregnated synthetic plastic that is relatively stiff, rather than resilient, having some flexibility, and adapted to withstand high temperatures, that is formed with an annular internal hinge groove so oriented with respect to the flange of the corresponding seal seat groove as to be reinforced thereby, enhancing flexibility of the jacket walls within a wide range of angulation of the duct end relative to the housing. Each of the duct ends mounts a positioning clip, the pair of clips normally limiting axial shifting of the housing to a range preventing disengagement from either of the tube ends, the clips being selectively displaceable to allow sufficient shifting of the housing to give access to the interior thereof for seal inspection and replacement.

9 Claims, 6 Drawing Figures

PATENTED AUG 1 1972
3,680,874
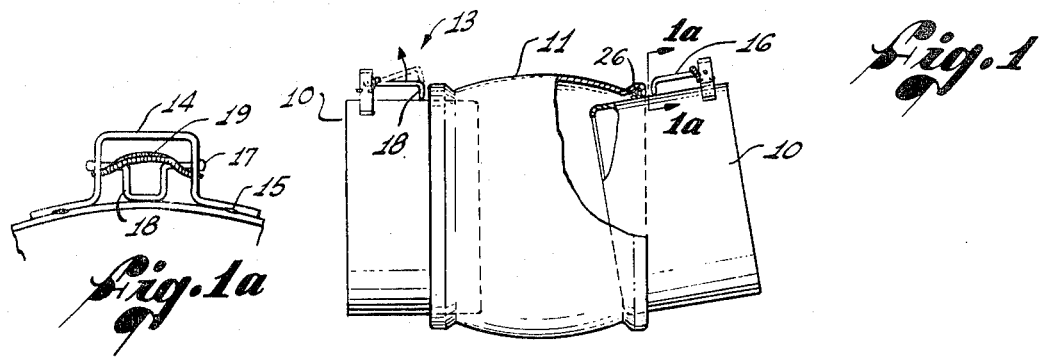
Fig. 1a
Fig. 1
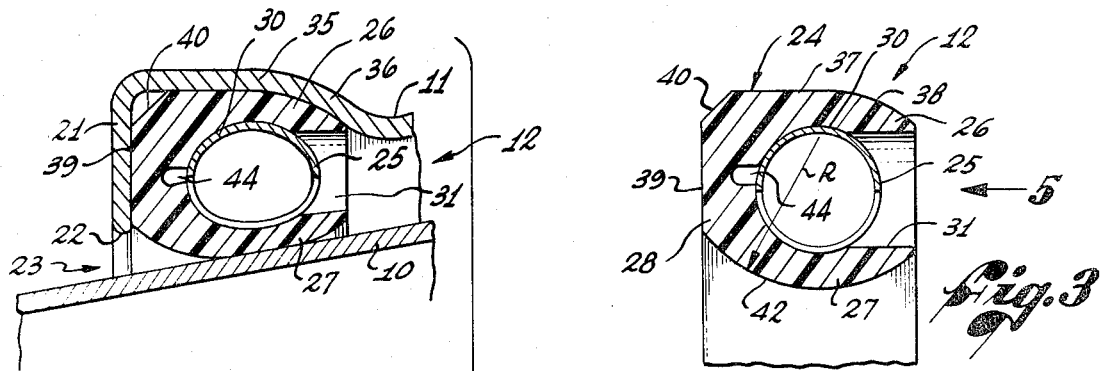
Fig. 2
Fig. 3
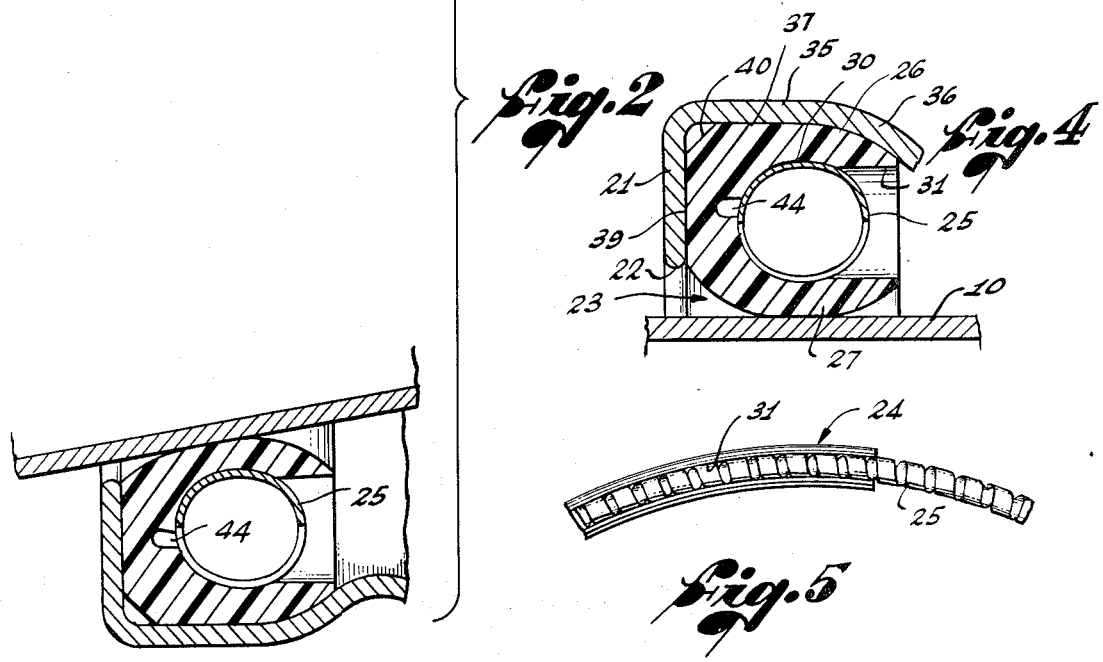
Fig. 4
Fig. 5
INVENTOR.
STEVEN E. SCHWARZ
BY Fulwider, Patton, Rieber
Lee, and Utecht
ATTORNEYS 3,680,874

FLEXIBLE PNEUMATIC DUCT CONNECTORS ASSEMBLED WITH INTERNAL SEALS

BACKGROUND OF THE INVENTION

The present invention relates to an improved flexible internally sealed duct connector assembly for use in hot gas piping systems, such as jet aircraft, to compensate for installation misalignment and to absorb thermal movement in the system.

In ducting systems for hot gases at high pressures it is essential to provide a means to interconnect adjacent duct ends in a manner to prevent leakage of the got gases. Typically, the pair of duct ends to be joined are misaligned, rather than aligned, usually being axially offset and/or having their axes angularly related rather than parallel. Accordingly, the duct connector must be capable of accommodating various degrees of angular relationship to the duct ends to be joined while, at the same time, providing a sealing means that is reliable throughout the possible range of angulation. The problem of providing a satisfactory seal to accommodate this angulation is further compounded by the fact that the sealing means employed must also be capable of providing a static seal, a negative pressure seal, and must accommodate relative axial and/or rotational movements of the parts. Additionally, since the duct connector must receive the adjacent tube ends through opposite ends with sufficient clearance to accommodate angular misalignment, the clearance gaps tend to induce undesirable extrusion of the seal ring material employed, particularly at the very high pressures and temperatures to which the connector is subjected. While seal ring materials which will satisfactorily withstand the high pressures and temperatures involved have been available, it has been a problem to adapt such materials to duct connectors involving angular misalignment particularly with regard to the prevention of extrusion of the seal material through the clearance gaps.

SUMMARY OF THE INVENTION

In general, the duct connector of this invention comprises a tubular housing that is internally formed at opposite ends with seal seat grooves, each groove holding a radially compressed spring-loaded gland or jacket that sealingly embraces one of a pair of tube ends. Positioning clips are carried on the tube ends, defining a pair of opposed stops to limit the range of axial shifting of the housing on the tube ends.

The seal seat grooves are integrally formed parts of the housing, each defined, in part, by a radially inwardly directed flange, the inner edges of the flanges defining the least diameter of the housing. Each groove is asymmetrical with respect to its median diametral plane, developing or necking on the side away from the flange into a frusto-conical tapered portion narrowing toward the center of the housing. The mid-portion of the housing is of a larger diameter than the housing ends. The arrangement is such that each tube end and the corresponding end flange of the housing are radially spaced apart to provide a clearance gap for angulating the tube end, the larger diameter portion of the housing similarly providing clearance for the inner end of the tube. The tube ends are flexibly interconnected to the opposite ends of the housing by means of a pair of sealing assemblies, each of which is mounted within one of the seal seat grooves of the housing.

Each seal assembly comprises an annular jacket containing a garter spring. The jacket is preferably made of a graphite-filled "Teflon" material having a generally C-shaped radial cross section whose opening faces axially of the jacket. The garter spring is preferably formed from an elongate strip of flat ribbon-like spring material, for example, stainless steel, or other heat resistant spring material, that is helically coiled with opposite ends of the strip being joined to define a circular length to fit within the jacket. The jacket internally defines a pocket of circular cross section to matingly receive the garter spring, the pocket diameter being the same as the normal unstressed radial diameter included by the turns of the garter spring band. With this arrangement, the garter spring, when in the jacket pocket, resiliently opposes radial compression of the seal assembly.

The unstressed inner diameter of the seal assembly, (including the garter spring), is such as to define an interference fit with the outer surface of the tube end to be received therein. The outer diameter of the unstressed seal assembly is formed, in part, with a cross sectional configuration adapted for mating reception within a seal seat groove of the housing end, with a close sliding or slight interference fit. Accordingly, when the seal assembly is in place, its spring is deformed along with the jacket, the radial compression producing a sealing engagement.

The jacket is formed with a radially flat face on the outside of the wall in opposition to the opening into the jacket, adapted for flat registration with the radial flange of the seal seat groove. This wall is relatively thick and, due to the nature of the material of which made, is stiff. In order to increase flexibility of the radially inner and outer sidewalls of the jacket, the circular cavity is formed with a circular flexure notch in opposition to the radial flange and radially outwardly beyond the inner edge of the flange. With this arrangement, sufficient flexibility is induced in the jacket to permit its radial compression and angulation of the tube end. At the same time sufficient jacket wall thickness is retained in opposition to the clearance gap to prevent extrusion of the material under very high temperatures and pressures. Further, the inside seal profile is a developed curvature adapted to accept all degrees of tube angulation while maintaining its sealing effectiveness on the tube end.

BRIEF DESCRIPTION OF THE DRAWINGS

FIG. 1 is a side elevational view of a duct connector assembly incorporating the invention.

FIG. 1a is a view, on an enlarged scale, taken along the line 1a—1a FIG. 1, showing details of construction of the positioning clip.

FIG. 2 is a broken diametral section, on a larger scale, through an interconnecting assembly of a tube end, seal assembly and one end of the housing.

FIG. 3 is a radial cross-sectional view of the seal assembly in the unstressed condition.

FIG. 4 is a half sectional view similar to FIG. 2, but with the tube end oriented coaxially with the housing.

FIG. 5 is a partial elevational view, in the direction of the arrow 5 of FIG. 3, with a portion of the jacket cut away.

DESCRIPTION OF THE PREFERRED EMBODIMENT

The duct connector assembly comprises a pair of tube ends 10 within opposite ends of the housing 11, the latter at opposite ends internally mounting a pair of seal assemblies 12 within which the pair of tube ends are mounted. Each of the tube ends 10 mounts a positioning means 13 to limit axial movement of the housing 11 relative to the tube ends. It will be understood that the tube ends 10 are rigidly interconnected to sections of other tubing of a hot gas piping system whereby the tube ends 10 are, in effect, fixed or restrained against movement. The housing 11, however, is unrestrained except for its frictional engagement with the inner surfaces of the pair of seal assemblies 12 and, accordingly, is rotatable and axially shiftable with respect to the tube ends.

While an exaggerated degree of angularity of one of the tube ends 10 is illustrated in FIG. 1, in the preferred embodiment the assembly is intended to normally accommodate angular misalignment of say on the order of between 0° and 7°. It should further be noted that the arrangement in FIG. 1 indicates a condition in which the axes of the two tube ends 10, though angularly related, do intersect. However, the invention may also be employed in situations in which the tube ends 10 have their axes parallel and offset from one another or they may have angularly related axes which do not intersect.

Each of the positioning clip means 13 comprises a bracket strap 14 of hat-shaped profile, disposed circumferentially of the tube end 10, having the bottom flanges thereof secured to the tube end, as by means of spot welds 15. An abutment clip 16 which may be formed of a wire rod material, has one end pivotally secured, as at 17, to the radially projecting legs of the bracket 14, the free end of the clip being bent radially inwardly, as indicated at 18, to serve as an abutment to limit axial displacement of the housing 11 by contact with an adjacent end of the housing. A pair of coil springs 19 each has its opposite ends interconnected to the pair of radially projecting legs of the bracket 14, the pair of springs being under tension and looped over the clip 16 to normally bias the clip into the full line position illustrated in FIG. 1.

The duct ends 10 being fixedly mounted in place, the arrangement of the positioning clip means 13 is such that the span between the abutment portions 18 thereof exceeds the overall length of the housing 11 mounted on the duct ends. Accordingly, in their normal position the abutment portions 18 of the pair of positioning clips positively limit the extent to which the housing 11 can be displaced relative to the duct ends. When it is desired to gain access to the interior of either end of the housing 11, for purposes of seal inspection or replacement, either one of the clips 16 may be raised, as indicated by the dotted line position in FIG. 1. Thereafter, the housing 11 may be shifted axially on one of the duct ends to be withdrawn from the other of the duct ends 10, after which one end of the housing is open permitting retrieval of the corresponding end seal assembly for inspection.

At both ends, the housing 11 is integrally formed with an internal seal seat groove that is defined, in part, by an endless radially inwardly directed flange 21, terminating in a radially innermost edge 22 of predetermined diameter. The relationship of the inner edge 22 of the flange 21 to the outer diameter of the tube 10 is such as to define a circumferential clearance gap 23, whose radial dimension is selected to permit the desired degree of freedom of angulation of the tube end relative to the housing 11. BY the same token, the mid portion of the housing 11 is enlarged to be of sufficient internal diameter to accommodate the maximum angulation of the tube end which is to be permitted.

By reference to FIG. 2 it will be seen that when a tube end is angularly related to the housing 11 that the clearance gap 23 is greatly enlarged at one side and diminished at the opposite side. Thus, at the upper end of FIG. 2 the gas 23 is on the order of double the magniture of the radial clearance between the flange edge 22 and the outside of the tube 10 in the lower half of the figure. Thus, the gap condition, essential to permit angulation, at the same time creates a dangerous condition that is especially conductive to extrusion of the seal material through the enlarged portion of the gap.

Each seal assembly 12 comprises an annular jacket 24 that encases an endless garter spring 25. As is shown in FIG. 3, the jacket 24 is generally C-shaped in radial cross-section, comprising a radially outer lip 26 and radially inner lip 27 joined together by a radial wall portion 28.

Internally, the wall portions of the jacket 24 define an endless pocket 30 which, in radial section, comprises a major portion of a circle communicating with an axially facing opening 31 of the jacket. The garter spring 25 is formed from a flat strip of ribbon-like heat resistant spring material, for example stainless steel. As is best seen in FIG. 5, the ribbon of metal is helically wound and, preferably, has its opposite ends permanently joined to define a garter of the same mean diameter as the mean diameter of the pocket 30 which is to receive the ribbon, or approximately so. Preferably, the radial diameter included by loops of the ribbon is the same, approximately, as the diameter of the circular section portion of the pocket 30. Although the width of the opening 31 into the jacket pocket 30 is narrower than the radial width of the garter spring 25, the coils of the spring can be sufficiently radially compressed to pass through the opening 31 to be seated in the pocket 30. Preferably, the proportions are such that the pocketed garter spring 25 is substantially relaxed within its pocket, with a close sliding fit or a snug fit, although the tolerances in this regard are not crucial.

The jacket 24 may be molded, extruded or machined to the desired shape from a synthetic resin that is though, durable and adapted to withstand high temperatures, having a low coefficient of friction and with some degree of flexibility. The preferred material is the polytetrafluoroethylene resin known as "Teflon." In order to further decrease the coefficient of friction and thus facilitate assembly of the parts, it is preferred that the resin material be impregnated with a suitable lubricant, such as graphite.

Preferably, each seal seat groove of the housing 11 is adapted to seat its seal assembly 12 in a manner to retain it against axial displacement, as well as to accomplish effective sealing action of the radially outer lip 26 against the inner surface of the groove. Accordingly, inwardly of the flange 21, each groove. develops into a substantially cylindrical section 35 and then into a necked down, substantially frusto-conical section 36.

The outer surface of the outer lip 26 of the jacket 24 is correspondingly shaped with a cylindrical portion 37 and a tapered section 38, which profile mates with the corresponding portions of the groove profile. The radial wall portion 28 of the jacket 25 has a flat radial surface 39 adapted for flat abutment with the inside face of the radial flange 21. A chamfer 40 may be defined at the intersection of surfaces 39 and 37 of the jacket to provide clearance to insure firm flat engagement of the jacket surface 39 against the flange 21 and of the jacket surface 37 against the groove portion 35.

The inner lip 27 of the jacket 24 is formed in radial section with a profile adapted to increase the wall thickness of the lip 27 at its junction with the radial wall 28 of the jacket. This profile, for example, may be a curve of constant radius R, as shown in FIG. 3, having its center within a diametral plane including the center of the pocket 30, radially outwardly of the center of the pocket 30, and of a length at least sufficient to produce a profile of the inner surface 42 adapted to intersect the flat radial wall 39 adjacent the radially inner edge 22 of the flange 21. At the same time, the least diameter defined by the surface 42 is smaller than the outer diameter of the tube end 10 to be mounted therewithin.

It is essential that the radial thickness of the jacket assembly 24 be such that the jacket is radially compressed when seated within its groove while mounting a tube end 10 therein. Thus, comparing FIGS. 3 and 4 it will be seen that the radial thickness of the seal assembly 24 has been substantially lessened and, in this preload condition, may be compressed on the order of 10 to 15 percent. However, the synthetic materials employed are not, typically, sufficiently resiliently compressable or flexible to achieve this or any satisfactory degree of radial compression in order to preload the seal and, also, maintain a sufficient wall thickness of the seal material to prevent extrusion under high pressures and temperatures while mounting an angularly related duct end 10 therewithin. To overcome these disadvantages of the seal material, successfully, a flexure notch is formed in the pocket 30 of the inner surface of the radial wall 28 of the jacket 24, the flexure notch 44 defining an endless circle. The notch 44 is disposed at least radially outwardly beyond the radially inner edge 22 of the flange 21, and, preferably, radially outwardly beyond the center of the pocket 30. Notch 44 has a depth, in the axial direction as viewed in FIG. 3, for example, of no more than half the thickness of the jacket wall 28 at that position. The wall portion 28 is, accordingly somewhat thinned and weakened but, by virtue of its being reinforced by the flange 21, nevertheless provides a satisfactory hinge for flexing of the radially inner lip 27 of the jacket.

In FIG. 4, the tube end 10 is positioned coaxially with the housing 11 and, accordingly, the seal assembly 12 is radially compressed in a diametral plane and the garter spring 25 and its pocket 30 are slightly deformed, in radial section, to a somewhat ovoid or elliptical configuration. AT the same time, that portion of the inner lip 27 in contact with the outer surface of the tube end 10 is slightly compressed and slightly flattened. The degree of compression or distortion of the spring and its pocket and the degree of the flattening of the sealing lip 27 are exaggerated in FIG. 4 (as well as in FIG. 2) in order to illustrate the sealing action which occurs, as is also the degree of deformation of the flexure notch 24. However, assuming an unpressurized condition of the ducting system, an effective seal is nevertheless provided since the coils of the spring 25 react throughout 360° to forcefully bias all outer surfaces of the jacket 24 against the confronting surfaces of the seal seat groove and the duct end 10. Under conditions of internal pressure, the sealing action increases proportionately with increase in pressure due to the presence of pressurized gas within the pocket of the jacket 24.

Ordinarily, a tube end 10 would not be angularly offset more than 7° with respect to the housing 11. However, FIG. 2 represents an extreme angular offset, on the order of 10°, which can actually be accommodated with smaller diameters of tubing. The extreme condition of FIG. 2 is shown, in order to particularly illustrate the manner in which the duct connector assembly provides a successful internal seal under conditions of angular misalignment of tube ends. While the gap 23 in the lower half of the drawing has been decreased it will be noted that the gap, in its diametrically opposite portion in the upper half of the drawing, is very greatly enlarged. HOwever, due to the presence of the flexure notch 44 and the profile given to the radially inner surface 42 of inner lip 27, the jacket is enabled to be radically flexibly deformed while at the same time maintaining an adequate seal wall thickness to prevent extrusion of the seal material through the gap 23.

As examination of FIG. 2 will show, the jacket lower lip surface 42 has a substantially elliptical line or path of sealing engagement around the duct end 10. Accordingly, the angle of the lip 27 relative to the axis of the housing 11 changes constantly, circularly of the lip, as illustrated by the two different lip angles at opposite ends of the major axis of the ellipse, shown in FIG. 2. From this, it will be appreciated that the lip profile 42 and the flexure groove 44 are critically important to successful sealing in this environment.

The duct construction of this invention is also extremely well suited to maintain the integrity of the internal seals under conditions of negative pressure. Due to the mating configuration of the radially outermost surfaces of the outer lip 26 of the jacket and the inner surfaces of the seal seat groove, the jacket 24 is successfully held against axial displacement in the groove. Since the sloping portion 36 of the groove provides a wedging action relative to the outer surface of the duct end 10 preventing axially inward movement of the jacket and, also, provides a surface against which the spring 25 reacts, the inner lip 27 is kept sealingly engaged with the outside surface of the duct end 10 at conditions of negative pressure. Due to the wedging action, as amplified by the negative pressure and the spring reaction, this result is attained and abetted by the presence of the flexure notch 44.

While the presently preferred embodiment of the invention has been described in considerable specific structural detail, it will be understood that the invention is susceptible to various changes and modifications within the purview of one skilled in the art.

I claim:

1. In a flexible pneumatic hot gas duct connector, the improvement comprising:

a housing with an end formed with a circumferential internal seal seat groove including a radially inwardly directed flange;

a duct end within said flange, of smaller external diameter than the diameter of the inner edge of said flange, to define a clearance gap for angular misalignment of the axis of said duct and of said housing;

an annular jacket of an essentially inelastic, relatively stiff, heat resistant synthetic plastic material formed with a radially outer wall with an outer surface adapted for seating within said groove of said housing end;

said jacket having a radially disposed wall adapted for flat engagement with the inside of said flange;

said jacket having a radially inner wall with a radially inner surface adapted for a sealing interference fit on the outside of said duct end whereby to interconnect said duct end to said housing;

said walls of said jacket defining an internal annular pocket with an endless opening facing axially inwardly of said housing for pressure fluid communication with gases in said housing; and said radially disposed wall of said jacket on the internal face thereof, within said pocket, being formed with an annular groove, of smaller radial cross-sectional area than the radial cross-sectional area of said pocket, in opposition to said flange for defining an endless relatively thin hinge portion of said radially disposed wall about which said inner and outer walls are flexibly biased, in response to fluid pressures internally of said jacket, into tighter sealing engagement with said duct end and said groove, respectively, and said inner wall is flexed to different degrees circularly around said jacket in response to angular misalignment of said duct end and said housing.

2. A flexible duct connector as in claim 1 in which said radially inner wall of said jacket increases in wall thickness toward said radially disposed wall in order to reinforce said inner wall against extrusion through said gap by the pressure of the gas.

3. A flexible duct connector as in claim 1 in which:
said internal annular pocket is adapted to retain a spring means; and
a circularly arranged spring means is disposed within said pocket for resiliently opposing compression radially across said inner and outer walls of said jacket;
said spring means and said pocket being keyed together against relative axial displacement.

4. A flexible duct connector as in claim 3 in which:
said pocket normally is partially of circular radial cross-section, in the unstressed condition; and
said spring means comprises an endless spring made of helically coiled flat ribbon whose coils define a radial diameter of said spring adapted for nesting engagement in said pocket;
said pocket and the coils of said spring being radially compressed when engaged on said duct end;
said flexure groove being positioned radially outwardly beyond said edge of said flange and opening into said pocket.

5. A flexible duct connector as in claim 4 in which:
the inner surface of said housing groove and the outer surface of said outer lip of said jacket have mating profiles adapted to key said jacket against axial displacement inwardly of said housing;
said profile including a portion converging towards said duct end and inwardly of said housing to wedgingly resist said axial displacement;
the convergent portion of said housing providing a rigid surface against which coils of said spring react to maintain said radially inner surface of said radially inner wall in sealing engagement with said duct and against a negative pressure condition.

6. A flexibly adjustable seal assembly for interconnecting a duct end to a housing with clearance to accommodate misalignment therebetween, comprising:
an annular jacket of a relatively stiff, heat resistant, synthetic plastic material having an annular pocket communicating with an axially opening entrance to said pocket;
said pocket, in radial section and in an unstressed condition of said jacket, being of a circular cross-section subtending the major part of a circle;
said jacket having a radial wall on the side thereof opposite said pocket entrance formed with an annular radial flat outer surface; and
a circularly arranged spring means extending circularly throughout said pocket, said spring means being formed of coils of a flat spring material, said coils defining a normal unstressed diameter adapted for mating engagement with the circular section of said pocket to be held against axial displacement;
said pocket being formed with an annular groove at the interior surface of said radial wall located radially outwardly relative to a radially inner edge of said flat outer surface of said radial wall;
said jacket having a radially inner wall with a radially inner sealing surface, said groove defining a circular hinge about which said inner wall is flexible to varying degrees when said jacket is radially compressed by an angularly misaligned duct end.

7. A flexibly adjustable seal assembly as in claim 6 in which said sealing surface of said inner wall is formed with cross-sectional profile providing an increasing wall thickness, relative to said pocket, from the least diameter of said sealing surface to said sealing surface's junction with said flat outer surface of said radial wall.

8. A flexibly adjusting seal assembly as in claim 7 in which said sealing surface, in the unstressed condition of said jacket, has the cross-sectional profile of a curve of constant radius that intersects said radially inner edge of said flat surface of said radial wall.

9. A flexibly adjusting seal assembly as in claim 6 in which said annular groove is located radially outwardly relative to the geometric center of said circular cross-section of said pocket.

* * * * *